United States Patent
Ishikawa

(10) Patent No.: US 8,141,137 B2
(45) Date of Patent: Mar. 20, 2012

(54) AUTHENTICATION VECTOR GENERATION DEVICE, SUBSCRIBER IDENTITY MODULE, MOBILE COMMUNICATION SYSTEM, AUTHENTICATION VECTOR GENERATION METHOD, CALCULATION METHOD, AND SUBSCRIBER AUTHENTICATION METHOD

(75) Inventor: Hidetoshi Ishikawa, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1086 days.

(21) Appl. No.: 11/167,108

(22) Filed: Jun. 28, 2005

(65) Prior Publication Data
US 2006/0003738 A1     Jan. 5, 2006

(30) Foreign Application Priority Data

Jul. 1, 2004 (JP) ................. P2004-195970
Nov. 30, 2004 (JP) ................. P2004-346949

(51) Int. Cl.
*H04L 29/06* (2006.01)
(52) U.S. Cl. ............. 726/6; 713/169; 713/172; 380/247
(58) Field of Classification Search ................. 713/169, 713/172; 726/6; 380/247; 455/411, 466
See application file for complete search history.

(56) References Cited

U.S. PATENT DOCUMENTS

| | | | |
|---|---|---|---|
| 6,690,930 B1 | 2/2004 | Dupre | |
| 7,321,968 B1 | 1/2008 | Capellaro et al. | |
| 2003/0017841 A1 | 1/2003 | Bos et al. | |
| 2003/0088769 A1* | 5/2003 | Quick et al. | 713/169 |
| 2003/0096595 A1* | 5/2003 | Green et al. | 455/411 |
| 2004/0029576 A1 | 2/2004 | Flykt et al. | |
| 2005/0251681 A1* | 11/2005 | Robles et al. | 713/172 |
| 2006/0172723 A1* | 8/2006 | Ishikawa | 455/411 |

FOREIGN PATENT DOCUMENTS

| | | |
|---|---|---|
| CN | 1475091 A | 2/2004 |
| EP | 1 331 559 A2 | 7/2003 |
| GB | 2 394 143 A | 4/2004 |
| JP | 2001-16634 | 1/2001 |
| JP | 2002-508908 | 3/2002 |

(Continued)

OTHER PUBLICATIONS

U.S. Appl. No. 11/332,534, filed Jan. 17, 2006, Ishikawa.
"3rd Generation Partnership Project; Technical Specification Group Services and System Aspects; 3G Security; Security architecture (Release 1999)", 3GPP TS 33.102 v3.13.0 (Dec. 2002)
"3rd Generation Partnership Project,", TS 33.102, [online], ver.4.4.0, [Retrieved on May 29, 2009], Retrieved from the Internet, 3GPP, Jun. 2002, p. 17-p. 26.

(Continued)

*Primary Examiner* — Kim Vu
*Assistant Examiner* — John B King
(74) *Attorney, Agent, or Firm* — Oblon, Spivak, McClelland, Maier & Neustadt, L.L.P.

(57) ABSTRACT

Authentication of a subscriber identity module issued by IMT-2000 network operator is performed with no decrease in the confidentiality of calculation processing, even in cases such as when a roaming network is a GSM network. An HLR of an IMT-2000 mobile communication network comprises an algorithm information attachment unit for attaching, to a RAND field of an authentication vector used to authenticate a USIM, information specifying an algorithm to be used in the authentication calculation. The USIM, which is mounted on a mobile equipment, comprises an algorithm storage unit storing in advance a plurality of algorithms for use in the authentication calculation, a specification unit for specifying the algorithm to be used in the calculation from among the plurality of algorithms stored in the algorithm storage unit by referring to the algorithm-specifying information included in received data, and a calculation unit for performing the calculation on the basis of the specified algorithm using the received data.

24 Claims, 6 Drawing Sheets

| | FOREIGN PATENT DOCUMENTS | |
|---|---|---|
| KR | 2001-0064799 | 7/2001 |
| TW | 200307442 | 4/2003 |
| TW | 200300320 | 5/2003 |
| TW | 595195 | 6/2004 |
| WO | WO 99/62275 | 12/1999 |
| WO | WO 02/45452 A1 | 6/2002 |
| WO | WO 03/056863 A2 | 7/2003 |

OTHER PUBLICATIONS

Office Action issued Jan. 19, 2011, in Europe Application No. 05 013 992.2-2412.

Chinese Office Action issued Aug. 17, 2011, in Patent Application No. 201010108163.3 (with English-language translation).

* cited by examiner

*Fig.6*
(a)
(b)
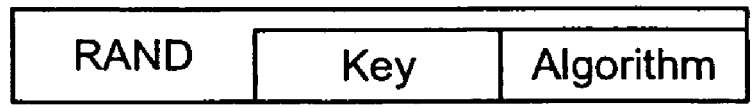

AUTHENTICATION VECTOR GENERATION DEVICE, SUBSCRIBER IDENTITY MODULE, MOBILE COMMUNICATION SYSTEM, AUTHENTICATION VECTOR GENERATION METHOD, CALCULATION METHOD, AND SUBSCRIBER AUTHENTICATION METHOD

BACKGROUND OF THE INVENTION

1. Field of the Invention

The present invention relates to an authentication vector generation device, a subscriber identity module, a mobile communication system, an authentication vector generation method, a calculation method, and a subscriber authentication method.

2. Related Background of the Invention

In IMT-2000 (International Mobile Telecommunication 2000), which is a third-generation mobile communication system, a subscriber identity module (USIM: Universal Subscriber Identity Module), issued by a network operator, a service provider or the like to which a subscriber to a mobile communication network is contracted (the mobile communication network serviced by the operator, a service provider or the like will be referred to as a "home network" hereafter), is mounted on subscriber side terminal equipment (ME: Mobile Equipment, corresponding to a mobile phone, cellular phone or other mobile device, for example), and in so doing, mutual authentication during outgoing-call, incoming-call, and so on between the home network, or a mobile communication network capable of roaming from the home network (to be referred to as a "roaming network" hereafter), and the subscriber identity module, is standardized.

In IMT-2000, the mobile communication network is constituted by an authentication vector generation device (HLR: Home Location Register) for generating an authentication vector (AV) used to authenticate the subscriber identity module, and an authentication device (VLR: Visitor Location Register) for performing authentication processing with the subscriber identity module. In IMT-2000, subscriber identity module authentication processing is performed in the following manner. First, the authentication device receives an authentication vector generated and transmitted by the authentication vector generation device, and transmits predetermined data included in the authentication vector to the subscriber identity module via the subscriber side terminal equipment. Next, on the basis of the predetermined data, a calculation is performed in the subscriber identity module using secret information and an algorithm stored in advance in the subscriber identity module. The calculation result is transmitted to the authentication device via the subscriber side terminal equipment, and verified in the authentication device to authenticate the subscriber identity module (see 3GPP TS 33. 102 V3. 13. 0 (2002-12): "3rd Generation Partnership Project (3GPP); Technical Specification Group Services and System Aspects; 3G Security; Security Architecture (Release 1999)" (Non-patent Document 1)).

Meanwhile, in GSM (Global System for Mobile Communications), which is a second generation mobile communication system that is compatible with IMT-2000, subscriber identity module authentication is performed in an almost identical framework to that described above, using a GSM subscriber identity module (SIM: Subscriber Identity Module). Note that it is technically possible to mount a USIM and an SIM on a single smart card (also known as a "IC (IC: Integrated Circuit) card" in Japan), and smart cards serving as subscriber identity modules having both USIM and SIM functions exist.

SUMMARY OF THE INVENTION

In IMT-2000, the authentication vector is known as a quintet, and comprises five fields, RAND, XRES, CK, IK, and AUTN. The data that are transmitted from the authentication device to the subscriber identity module via the subscriber side terminal equipment in order to authenticate the subscriber identity module are the data in the RAND and AUTN fields. In the conventional IMT-2000 specification, it is cited that the AUTN field includes information specifying an algorithm, selected from among a plurality of algorithms stored in the subscriber identity module, for use in the calculation performed in the subscriber identity module for the purpose of authentication. In the subscriber identity module, the algorithm to be used in the authentication calculation is specified from among the plurality of algorithms on the basis of this information, whereupon the calculation is performed. As a result, the confidentiality of the calculation processing is increased, enabling highly secure authentication. Further, using a similar method to that described above, in which information specifying an algorithm is included in the AUTN field, secret information for use in the calculation may also be specified from among a plurality of information in the subscriber identity module with the aim of improving the confidentiality of the calculation processing and the security of the authentication.

Meanwhile, a GSM authentication vector is known as a triplet, and comprises three fields, namely RAND, RES, and Kc. Thus the format of the authentication vector differs between IMT-2000 and GSM. As a result, the following problem occurs during roaming, for example. According to Non-patent Document 1, when a roaming network is a GSM network and authentication is performed using a triplet, if the authentication vector generation device of the home network generates and transmits a quintet, authentication vector conversion from a quintet to a triplet is performed in the roaming network. During this conversion from a quintet to a triplet, the AUTN field is deleted, and therefore the information specifying the algorithm to be used in the calculation is also deleted from the authentication vector. In other words, if the home network is an IMT-2000 network and the roaming network is a GSM network, authentication based on a calculation using an algorithm specified from among a plurality of algorithms cannot be performed. This may lead to a deterioration in the confidentiality of the calculation processing. This problem occurs similarly as for secret information, known only to the authentication vector generation device and the subscriber identity module, used in the calculation in order to improve the confidentiality of the authentication process.

It is therefore an object of the present invention to provide an authentication vector generation device, a subscriber identity module, a mobile communication system, an authentication vector generation method, a calculation method, and a subscriber authentication method, with which subscriber identity module authentication can be performed with no decrease in the confidentiality of the calculation processing, even in cases such as when a roaming network is a GSM network.

An authentication vector generation device of the present invention comprises: authentication vector generating means for generating an authentication vector used to authenticate a subscriber identity module in a mobile communication network, the authentication vector having a field for storing random numbers used in an authentication calculation performed in the subscriber identity module; and attaching means for attaching, to this field of the generated authentication vector, information specifying calculation information that is constituted by at least one of an algorithm and secret information for use in the calculation.

A subscriber identity module of the present invention is mounted on subscriber side terminal equipment, and comprises: calculation information storage means storing in advance a plurality of calculation information constituted by at least one of an algorithm and secret information for use in a calculation to authenticate the subscriber identity module; reception means for receiving data for use in the calculation, transmitted from the subscriber side terminal equipment and including at least data in a field storing random numbers for use in the calculation, the field being provided in an authentication vector used to authenticate the subscriber identity module in a mobile communication network; specifying means for specifying calculation information to be used in the calculation from the plurality of calculation information stored in the calculation information storage means by referring to information specifying the calculation information in the data of the field, included in the received data; calculating means for performing the calculation on the basis of the specified calculation information using the received data; and transmitting means for transmitting information regarding a calculated result of the calculation to the subscriber side terminal equipment.

In the authentication processing performed using the authentication vector generation device and subscriber identity module described above, first the information specifying the calculation information, which is constituted by at least one of an algorithm and secret information, is attached to the aforementioned field, which is neither deleted nor converted during conversion from a quintet to a triplet, by the authentication vector generation device. Hence, even when the quintet is converted to a triplet, data including the calculation information-specifying information can be received in the subscriber identity module, and thus the authentication calculation is performed using the specified calculation information. Therefore, authentication of the subscriber identity module can be performed with no decrease in the confidentiality of the calculation processing, even in cases such as when the roaming network is a GSM network.

Incidentally, the present invention may be described not only as an authentication vector generation device and a subscriber identity module, as described above, but also as a mobile communication system, an authentication vector generation method, a calculation method, and a subscriber authentication method, as described below. These are merely different ways of categorizing the present invention, and the present invention remains substantially the same, exhibiting similar actions and effects.

A mobile communication system of the present invention is constituted by an authentication vector generation device and a subscriber identity module mounted on subscriber side terminal equipment. The authentication vector generation device comprises: authentication vector generating means for generating an authentication vector used to authenticate the subscriber identity module in a mobile communication network, the authentication vector having a field for storing random numbers used in an authentication calculation performed in the subscriber identity module; and attaching means for attaching, to this field of the generated authentication vector, information specifying calculation information that is constituted by at least one of an algorithm and secret information for use in the calculation. The subscriber identity module comprises: calculation information storage means storing in advance a plurality of calculation information for use in the calculation to authenticate the subscriber identity module; reception means for receiving data for use in the calculation, transmitted from the subscriber side terminal equipment and including at least data in the field of the authentication vector used to authenticate the subscriber identity module in the mobile communication network; specifying means for specifying the calculation information to be used in the calculation from the plurality of calculation information stored in the calculation information storage means by referring to the information specifying the calculation information in the data of the field, included in the received data; calculating means for performing the calculation on the basis of the specified calculation information using the received data; and transmitting means for transmitting information regarding a calculated result of the calculation to the subscriber side terminal equipment.

An authentication vector generation method of the present invention is executed in an authentication vector generation device, and comprises the steps of: generating an authentication vector used to authenticate a subscriber identity module in a mobile communication network, the authentication vector having a field for storing random numbers used in an authentication calculation performed in the subscriber identity module; and attaching to this field of the generated authentication vector information specifying calculation information that is constituted by at least one of an algorithm and secret information for use in the calculation.

A calculation method of the present invention is executed in a subscriber identity module mounted on subscriber side terminal equipment and storing in advance a plurality of calculation information constituted by at least one of an algorithm and secret information to be used in a calculation to authenticate the subscriber identity module. The calculation method comprises the steps of: receiving data for use in the calculation, transmitted from the subscriber side terminal equipment and including at least data in a field storing random numbers for use in the calculation, the field being provided in an authentication vector used to authenticate the subscriber identity module in a mobile communication network; specifying calculation information to be used in the calculation from the plurality of calculation information by referring to information specifying the calculation information in the data of the field, included in the received data; performing the calculation on the basis of the specified calculation information using the received data; and transmitting information regarding a calculated result of the calculation to the subscriber side terminal equipment.

A subscriber authentication method of the present invention is executed in a mobile communication system comprising an authentication vector generation device, and a subscriber identity module mounted on subscriber side terminal equipment and storing in advance a plurality of calculation information that is constituted by at least one of an algorithm and secret information used in a calculation to authenticate the subscriber identity module. In the authentication vector generation device, the subscriber authentication method comprises the steps of: generating an authentication vector used to authenticate the subscriber identity module in a mobile communication network, the authentication vector having a field for storing random numbers used in the authentication calculation performed in the subscriber identity module; and attaching to this field of the generated authentication vector information specifying calculation information to be used in the calculation. In the subscriber identity module, the subscriber authentication method comprises the steps of: receiving data for use in the calculation, transmitted from the subscriber side terminal equipment and including at least data in the field of the authentication vector used to authenticate the subscriber identity module in the mobile communication network; specifying the calculation information to be used in the calculation from the plurality of calculation information by referring to the information specifying the calculation information in the data of the field, included in the received data; performing the calculation on the basis of the specified calculation information using the received data; and transmitting information regarding a calculated result of the calculation to the subscriber side terminal equipment.

Further, an authentication vector generating device of the present invention comprises: authentication vector generating means for generating an authentication vector used to authenticate a subscriber identity module in a mobile communication network, the authentication vector having a field for storing random numbers used in an authentication calculation performed in the subscriber identity module; and algorithm information attaching means for attaching, to this field of the generated authentication vector, information specifying an algorithm for use in the authentication calculation performed in the subscriber identity module.

Further, a subscriber identity module of the present invention is mounted on subscriber side terminal equipment, and comprises: algorithm storage means storing in advance a plurality of algorithms for use in a calculation to authenticate the subscriber identity module; reception means for receiving data for use in the calculation, transmitted from the subscriber side terminal equipment and including at least data in a field storing random numbers for use in the calculation, the field being provided in an authentication vector used to authenticate the subscriber identity module in a mobile communication network; specifying means for specifying an algorithm to be used in the calculation from the plurality of algorithms stored in the algorithm storage means by referring to information specifying the algorithm in the data of the field, included in the received data; calculating means for performing the calculation on the basis of the specified algorithm using the received data; and transmitting means for transmitting information regarding a calculated result of the calculation to the subscriber side terminal equipment.

In the authentication processing performed using the authentication vector generation device and subscriber identity module described above, first the information specifying the algorithm is attached to the aforementioned field, which is neither deleted nor converted during conversion from a quintet to a triplet, by the authentication vector generation device. Hence, even when the quintet is converted to a triplet, data including the algorithm-specifying information can be received in the subscriber identity module, and thus the authentication calculation is performed using the specified algorithm. Therefore, authentication of the subscriber identity module can be performed with no decrease in the confidentiality of the calculation processing, even in cases such as when the roaming network is a GSM network.

Incidentally, the present invention may be described not only as an authentication vector generation device and a subscriber identity module, as described above, but also as a mobile communication system, an authentication vector generation method, a calculation method, and a subscriber authentication method, as described below. These are merely different ways of categorizing the present invention, and the present invention remains substantially the same, exhibiting similar actions and effects.

A mobile communication system of the present invention is constituted by an authentication vector generation device and a subscriber identity module mounted on subscriber side terminal equipment. The authentication vector generation device comprises: authentication vector generating means for generating an authentication vector used to authenticate the subscriber identity module in a mobile communication network, the authentication vector having a field for storing random numbers used in an authentication calculation performed in the subscriber identity module; and algorithm information attaching means for attaching, to this field of the generated authentication vector, information specifying an algorithm for use in the calculation. The subscriber identity module comprises: algorithm storage means storing in advance a plurality of algorithms for use in the calculation to authenticate the subscriber identity module; reception means for receiving data for use in the calculation, transmitted from the subscriber side terminal equipment and including at least data in the field of the authentication vector used to authenticate the subscriber identity module in the mobile communication network; specifying means for specifying the algorithm to be used in the calculation from the plurality of algorithms stored in the algorithm storage means by referring to the information specifying the algorithm in the data of the field, included in the received data; calculating means for performing the calculation on the basis of the specified algorithm using the received data; and transmitting means for transmitting information regarding a calculated result of the calculation to the subscriber side terminal equipment.

Further, an authentication vector generation method of the present invention is executed in an authentication vector generation device, and comprises the steps of: generating an authentication vector used to authenticate a subscriber identity module in a mobile communication network, the authentication vector having a field for storing random numbers used in an authentication calculation performed in the subscriber identity module; and attaching to this field of the generated authentication vector information specifying an algorithm for use in the calculation.

Further, a calculation method of the present invention is executed in a subscriber identity module mounted on subscriber side terminal equipment and storing in advance a plurality of algorithms to be used in a calculation to authenticate the subscriber identity module. The calculation method comprises the steps of: receiving data for use in the calculation, transmitted from the subscriber side terminal equipment and including at least data in a field storing random numbers for use in the calculation, the field being provided in an authentication vector used to authenticate the subscriber identity module in a mobile communication network; specifying an algorithm to be used in the calculation from the plurality of algorithms by referring to information specifying the algorithm in the data of the field, included in the received data; performing the calculation on the basis of the specified algorithm using the received data; and transmitting information regarding a calculated result of the calculation to the subscriber side terminal equipment.

Further, a subscriber authentication method of the present invention is executed in a mobile communication system comprising an authentication vector generation device, and a subscriber identity module mounted on subscriber side terminal equipment and storing in advance a plurality of algorithms used in a calculation to authenticate the subscriber identity module. In the authentication vector generation device, the subscriber authentication method comprises the steps of: generating an authentication vector used to authenticate the subscriber identity module in a mobile communication network, the authentication vector having a field for storing random numbers used in the authentication calculation performed in the subscriber identity module; and attaching to this field of the generated authentication vector information specifying an algorithm to be used in the calculation. In the subscriber identity module, the subscriber authentication method comprises the steps of: receiving data for use in the calculation, transmitted from the subscriber side terminal equipment and including at least data in the field of the authentication vector used to authenticate the subscriber identity module in the mobile communication network; specifying the algorithm to be used in the calculation from the plurality of algorithms by referring to the information specifying the algorithm in the data of the field, included in the received data; performing the calculation on the basis of the specified algorithm using the received data; and transmitting information regarding a calculated result of the calculation to the subscriber side terminal equipment.

According to the present invention, the information specifying the calculation information, which is constituted by at least one of an algorithm and secret information, is included in the aforementioned field, which is neither deleted nor converted when the authentication vector is converted from a quintet to a triplet, and hence the authentication calculation is performed in the subscriber identity module using the specified calculation information. As a result, the subscriber identity module can be authenticated with no decrease in the confidentiality of the calculation processing, even in cases such as when the roaming network is a GSM network.

BRIEF DESCRIPTION OF THE DRAWINGS

FIG. 6 is a view showing a RAND field of an authentication vector in the modified example.

DESCRIPTION OF THE PREFERRED EMBODIMENTS

The present invention can be understood easily by means of the following detailed description, which is provided with reference to the attached drawings illustrating examples thereof. Embodiments of the present invention will now be described with reference to these attached drawings. Wherever possible, identical parts have been allocated identical reference symbols, and duplicate description thereof has been omitted.

Figure 1:
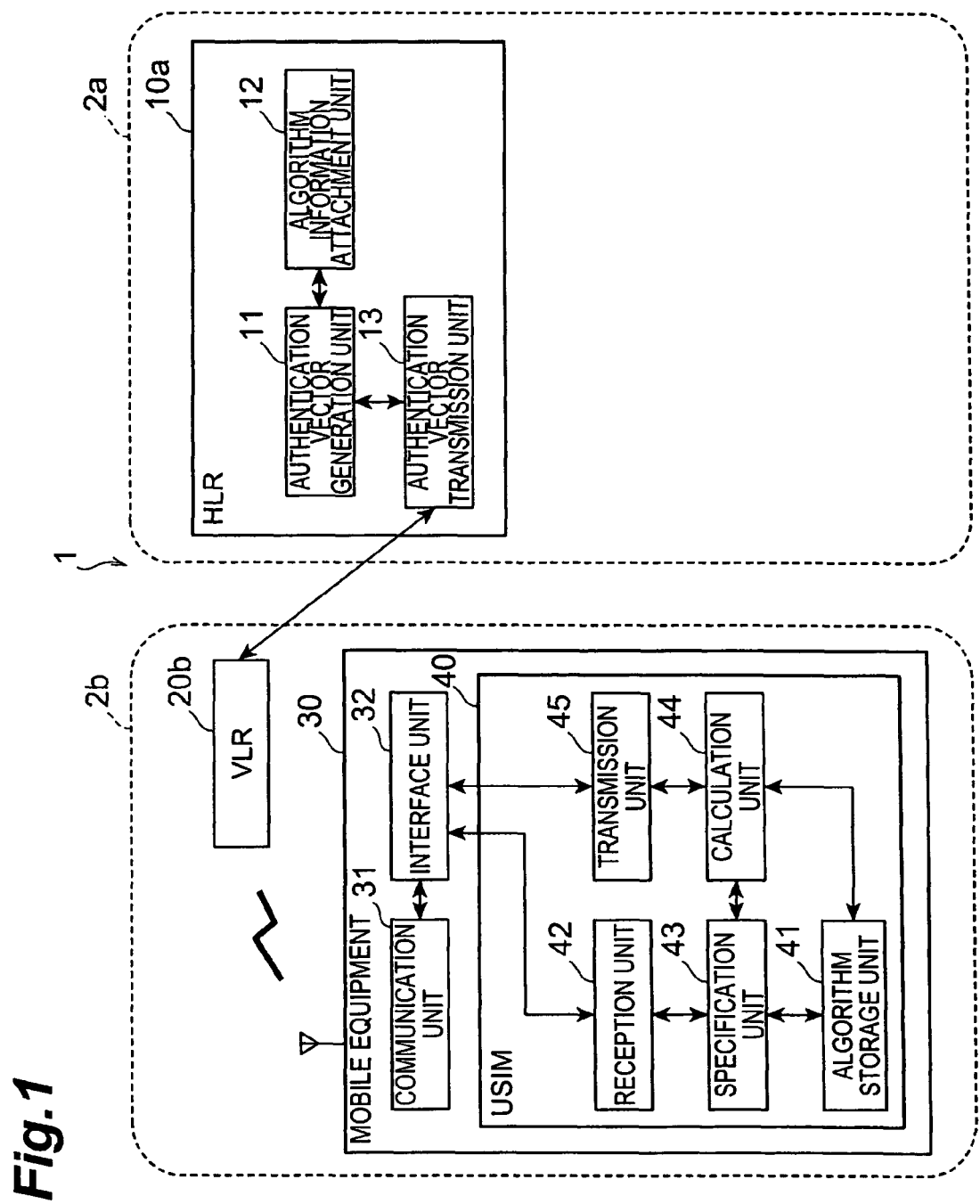
FIG. 1 is a view showing the constitution of a mobile communication system according to an embodiment.

FIG. 1 shows the constitution of a mobile communication system 1 comprising an HLR 10 (authentication vector generation device) and a USIM 40 (subscriber identity module) according to this embodiment. In the mobile communication system 1, a mobile communication network 2 exists for each network provider. In the mobile communication system 1, when a mobile equipment 30 (subscriber side terminal equipment) is not within a communication area of the mobile communication network of the network provider to which a subscriber of the mobile equipment 30 is contracted, but is within a communication area of the mobile communication network of another network provider, communication can be performed via the latter network. In other words, roaming is possible in the mobile communication system 1.

In this embodiment, a mobile communication network 2a is set as the mobile communication network of the network provider to which the subscriber of the mobile equipment 30 is contracted (this mobile communication network will be referred to as "home network 2a" hereafter), and a mobile communication network 2b is set as the mobile communication network of another network provider (this mobile communication network will be referred to as "roaming network 2b" hereafter). Furthermore, it is assumed that the home network 2a is an IMT-2000 network, whereas the roaming network 2b is a GSM network. Note that the home network 2a and roaming network 2b may be networks other than IMT-2000 and GSM networks as long as they are mobile communication networks which employ a system of authenticating a subscriber identity module using an authentication vector. The various constitutional elements of the mobile communication system 1 will now be described.

The HLR 10 is a device for generating an authentication vector (AV) used to authenticate the subscriber identity module of a mobile communication network, and exists in each mobile communication network 2. The HLR of the mobile communication network 2a is set as an HLR 10a. Specifically, the HLR 10 is preferably realized by an information processing device constituted by a CPU, memory, and so on. As shown in FIG. 1, the HLR 10 comprises an authentication vector generation unit 11 (authentication vector generating means), an algorithm information attachment unit 12 (algorithm information attaching means), and an authentication vector transmission unit 13.

The authentication vector generation unit 11 generates an authentication vector used to authenticate the subscriber identity module. An authentication vector is generated by generating electronic data having a plurality of fields. The algorithm information attachment unit 12 reads the authentication vector generated by the authentication vector generation unit 11, and includes in the RAND field of the authentication vector algorithm-specifying information specifying an algorithm to be used in the authentication calculation performed in the USIM 40. The authentication vector, generated by the authentication vector generation unit 11 and attached with the algorithm-specifying information by the algorithm information attachment unit 12, is transmitted to the authentication vector transmission unit 13. The authentication vector transmission unit 13 transmits the generated authentication vector to a VLR 20. Note that the information specifying the algorithm is preferably determined upon reception of an instruction from a control terminal (not shown) known as a console that is connected to the HLR 10.

The authentication vector generated by the HLR 10a of the home network 2a, or in other words the authentication vector generated in order to authenticate USIM 40, will now be described. The home network 2a is an IMT-2000 mobile communication network, and therefore the authentication vector generated by the HLR 10a of the home network 2a is a quintet such as that shown in FIG. 3, comprising five fields, namely RAND, XRES, CK, IK, and AUTN.

Here, random number information used for the calculation in the USIM 40 is included in the RAND field. Appropriate values are selected in the HLR 10a to serve as this random number information. Information for verifying the result of the calculation performed in the USIM 40 is included in the XRES field. This information is preferably determined according to secret information and algorithms that are known only to the HLR 10a and the authentication subject USIM 40. Information for making the wireless communication line confidential is included in the CK field. Information for checking the wireless communication content is included in the IK field. Information for authenticating the mobile communication network 2 in the USIM 40 is included in the AUTN field. In the specifications of Non-patent Document 1 described above, it is cited that information specifying the algorithm to be used in the authentication calculation is included in an AMF field of the AUTN field in the quintet. Note that when authentication is performed by a VLR 20*b* of the roaming network 2*b*, the quintet may be converted into a triplet. The content of this conversion will be described hereafter.

The VLR 20 is a device for performing the actual authentication processing using the authentication vector generated by the HLR 10. The VLR 20 also exists for each mobile communication network 2. When the mobile equipment 30 is connected to the home network 2*a* from the roaming network 2*b* due to roaming, authentication processing is performed by the VLR 20*b* of the roaming network 2*b*. The authentication processing performed by the VLR 20 will be described in detail hereafter.

The mobile equipment 30 is used by a subscriber to the mobile communication network, and serves to perform communication in the mobile communication system 1. Here, the term "communication" signifies voice communication, packet communication, and so on, for example. As shown in FIG. 1, the mobile equipment 30 comprises a communication unit 31 having a mobile communication function, and an interface 32 for transmitting and receiving information to and from the USIM 40.

The USIM 40 is a device that is mounted on the mobile equipment 30 for performing calculations required in the subscriber identity module authentication performed by the VLR 20. Specifically, the USIM 40 is preferably realized as an IC card that can be attached to the mobile equipment 30, and stores information relating to the telephone number of the subscriber and the network provider to which the subscriber is contracted. As shown in FIG. 1, the USIM 40 comprises an algorithm storage unit 41 (algorithm storage means), a reception unit 42 (reception means), a specification unit 43 (specifying means), a calculation unit 44 (calculating means), and a transmission unit 45 (transmitting means).

The algorithm storage unit 41 stores in advance a plurality of algorithms used in the authentication calculation. Preferred examples of the stored algorithms include 3DES (Data Encryption Standard), Milenage, AES (Advanced Encryption Standard), and other algorithms suitable for use in the authentication calculation. Furthermore, the stored algorithms are usually known only to the HLR 10 and USIM 40. Typically, secret information for use in the authentication calculation, known only to the HLR 10 and USIM 40, is also stored in order to enhance the confidentiality of the authentication process.

The reception unit 42 receives data used in the calculation from the interface unit 32 of the mobile equipment 30. At least the information in the RAND field of the authentication vector is included in the data received from the mobile equipment 30. The received data are transmitted to the specification unit 43. The specification unit 43 specifies the algorithm to be used in the authentication from the plurality of algorithms stored in the algorithm storage unit 41 by referring to the algorithm-specifying information included in the RAND field of the authentication vector in the received data. Information regarding the specified algorithm is transmitted to the calculation unit 44.

On the basis of the specified algorithm, the calculation unit 44 performs the authentication calculation using the received data. Information regarding the calculation result is transmitted to the transmission unit 45 for transmission to the mobile equipment 30. The transmission unit 45 transmits information regarding the calculated result of the calculation to the mobile equipment 30.

The processing executed by the mobile communication system 1 of this embodiment will now be described using the sequence diagram of FIG. 2. This processing is executed to authenticate the USIM 40 during outgoing-call or incoming call when the mobile equipment 30 is positioned within the communication area of the roaming network 2*b*.

First, the VLR 20*b* of the roaming network 2*b* transmits a request to the HLR 10*a* of the home network 2*a* to issue an authentication vector for authenticating the USIM 40 (S01). In the HLR 10*a* which receives the issuance request, the authentication vector generating unit 11 generates an authentication vector corresponding to the USIM 40 on the basis of information specifying the USIM 40 included in the issuance request (S02). As described above, the home network 2*a* is an IMT-2000 network, and therefore the generated authentication vector is a quintet. Note that the information in the XRES field of the generated authentication vector is usually calculated on the basis of a predetermined algorithm from the random number information included in the RAND field and secret information corresponding to the USIM 40, which is stored in the HLR 10*a* in advance. This predetermined algorithm is used in the authentication calculation performed in the USIM 40. Furthermore, this algorithm is selected from among a plurality of algorithms stored in the USIM 40.

Figure 3:
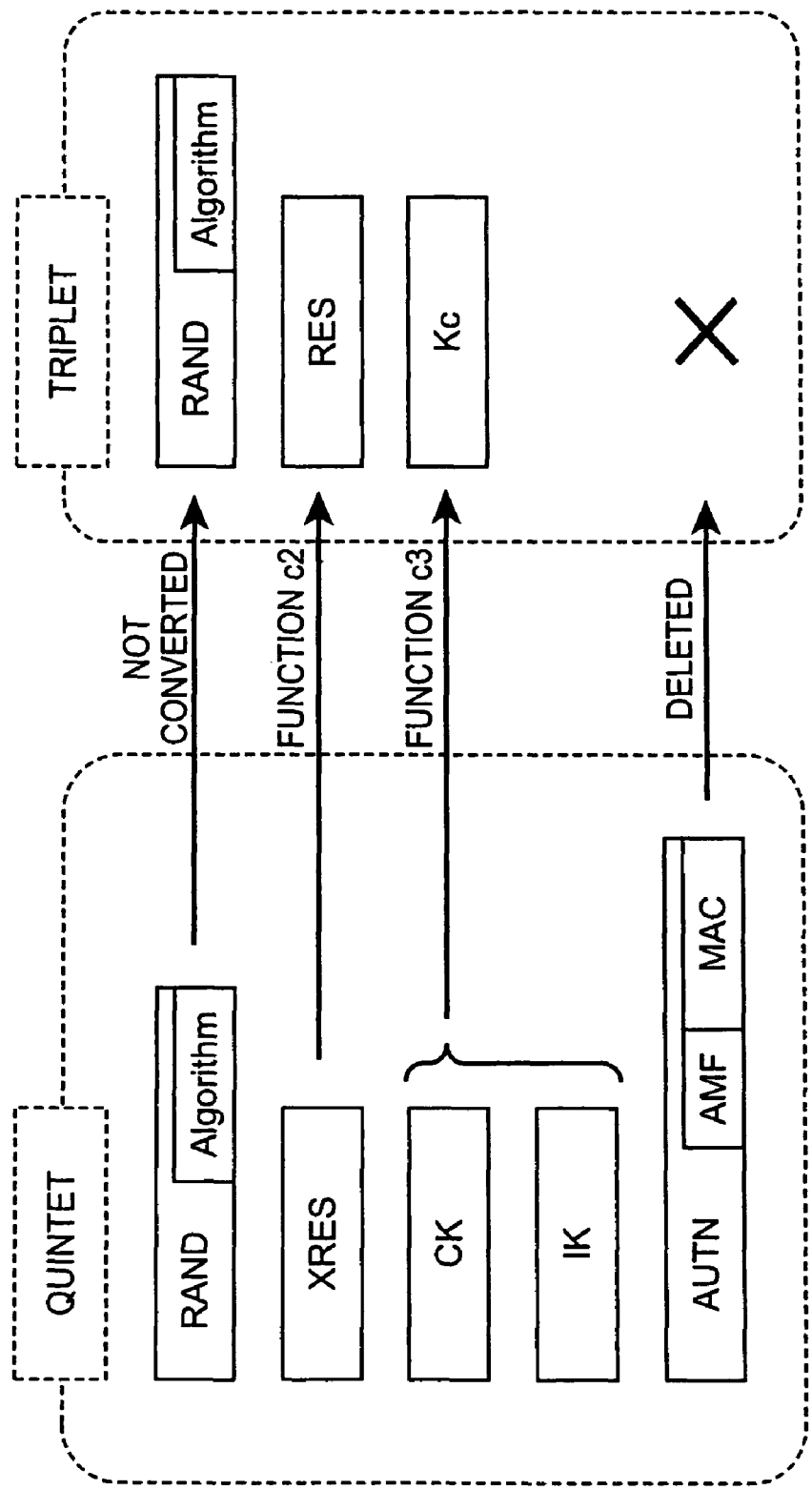
FIG. 3 is a view showing the constitution of a quintet and a triplet, and conversion from the quintet to the triplet.

Next, in the HLR 10*a*, the algorithm information attachment unit 12 attaches to the RAND field of the generated authentication vector information specifying the algorithm to be used in the authentication calculation in the subscriber identity module (S03). More specifically, as shown in FIG. 3, an Algorithm field of an appropriate data length is preferably provided in the RAND field as a field for specifying an algorithm, for example, and a character string specifying the algorithm is included in the Algorithm field. Here, character strings are associated with algorithms in advance such that the character string "01h" corresponds to 3DES, the character string "02h" corresponds to Milenage, the character string "03h" corresponds to AES, and so on, for example. Note that the random number information that is included originally in the RAND field must also be included here, and therefore the algorithm-specifying field should be made as small as possible. Further, the algorithm-specifying information may be encoded using any method, or may remain as plain text. In the description of this embodiment, authentication vector generation (S02) and algorithm information attachment (S03) are depicted as separate processes, but authentication vector generation and algorithm information attachment may be performed in a single process.

The generated authentication vector is transmitted to the authentication vector transmission unit 13, and issued therefrom. More specifically, the authentication vector transmission unit 13 transmits the authentication vector to the VLR 20*b* which issued the authentication vector issuance request (S04). The VLR 20*b* receives the transmitted authentication vector. The authentication vector is a quintet, but since the roaming network 2*b* is a GSM network which performs authentication using a triplet, the VLR 20*b* converts the quintet into a triplet (S05). More specifically, this conversion is performed in the manner shown in FIG. 3. As shown in FIG. 3, the RAND field data serve as the RAND field data of the triplet without being converted. The XRES field data are converted using a predetermined function c2 and thus serve as the RES field data of the triplet. The data in the CK and IK fields are converted using a predetermined function c3, and thus serve as the Kc field data of the triplet. The AUTN field data are deleted during conversion into the triplet. The algorithm-specifying information is included in the RAND field, which is not converted by a function or the like, and hence this information is passed over to the triplet as is.

Note that the triplet conversion described above is performed in the VLR 20*b*, but depending on the mobile communication system, conversion may be performed in the HLR 10*a*, whereupon the resultant triplet is transmitted to the VLR 20*b*.

Next, the VLR 20*b* transmits the authentication information to the USIM 40 (S06). At least the RAND field information is included in the authentication information. This transmission is performed via a base station (not shown), and the communication unit 31 and interface unit 32 of the mobile equipment 30.

Next, in the USIM 40, the reception unit 42 receives the authentication information transmitted from the mobile equipment 30, or in other words the data to be used in the authentication calculation. Once the data have been received, the specification unit 43 reads the data, and specifies an algorithm from the algorithms stored in the algorithm storage unit 41 by referring to the algorithm-specifying information included in the RAND field (S07). Specifically, algorithm specification is preferably performed by reading out the character string indicating the algorithm in the aforementioned Algorithm field, and comparing this character string with the correspondence information between the pre-stored character strings and algorithms.

Next, the calculation unit 44 performs the authentication calculation on the basis of the algorithm specified by the specification unit 43 using the secret information and the random number information included in the RAND field (S08). The calculation result is transmitted to the transmission unit 45, whereupon the transmission unit 45 transmits the calculation result to the mobile equipment 30. The transmitted calculation result is transmitted to the VLR 20*b* via the communication unit 31 of the mobile equipment 30 and the base station (S09). Having received the calculation result, the VLR 20*b* uses the verification information included in the XRES field of the authentication vector to verify whether or not the calculation result is correct, and then performs authentication of the USIM 40 (S10). More specifically, verification is performed by determining whether or not the value included in the XRES field is identical to the value of the calculation result.

According to this embodiment as described above, authentication calculation is performed after specifying an algorithm, even when the roaming network 2*b* is a GSM network. Hence, the USIM 40 can be authenticated with no decrease in the confidentiality of the calculation processing. Accordingly, the USIM 40 may be used for a longer time in terms of security. Preventing decreases in the confidentiality of the calculation processing also works as a measure against cloning of the USIM 40.

Figure 2:
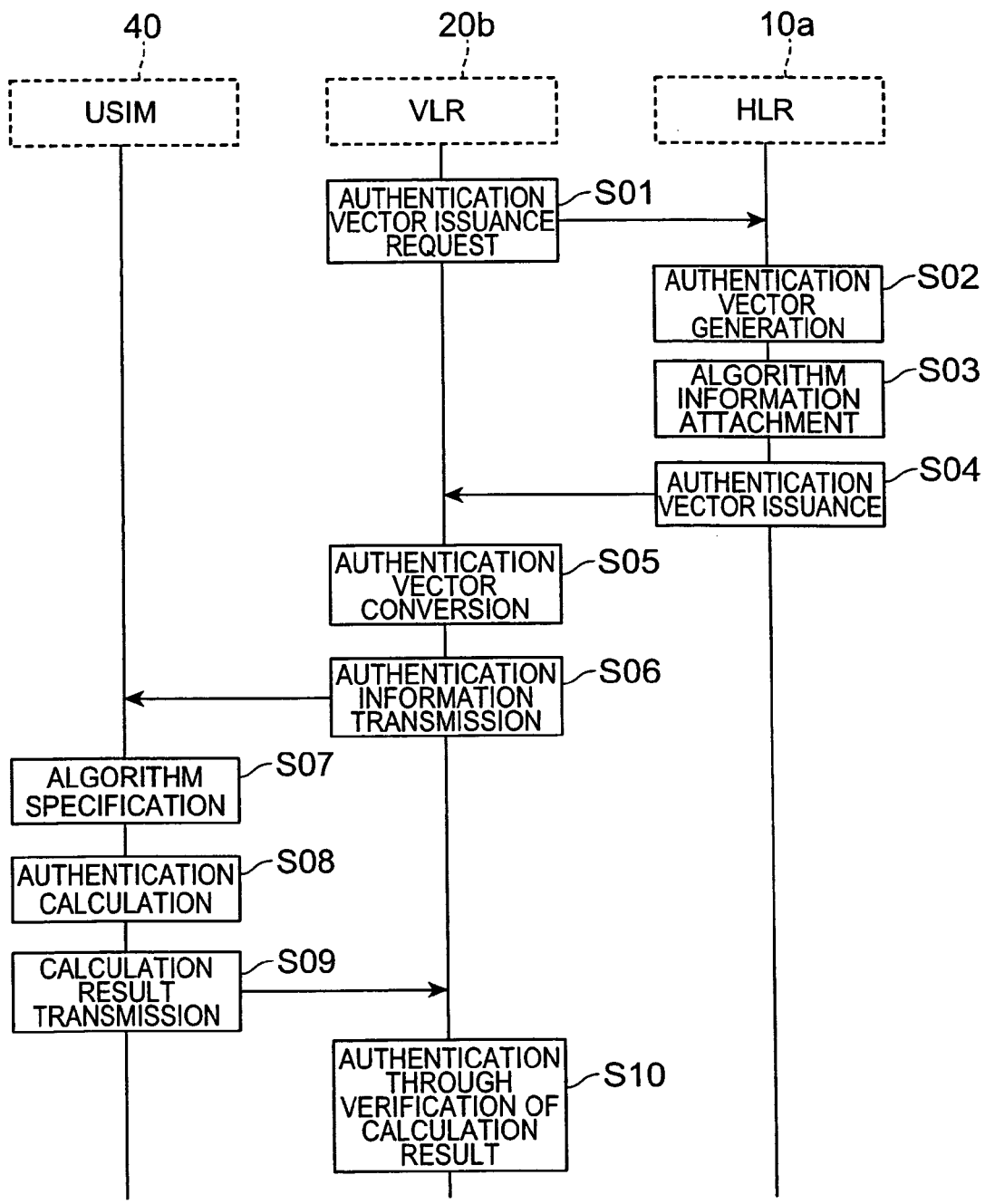
FIG. 2 is a sequence diagram showing processing executed by the mobile communication system in this embodiment.

Furthermore, the only parts of this embodiment that need to be modified from a conventional mobile communication system are the authentication vector generation process in the HLR 10*a* (S02, S03 in FIG. 2), and the calculation process in the USIM 40 (S07, S08 in FIG. 2). The VLR 20*b* does not need to modified at all, and can therefore be realized easily.

Note that in the embodiment described above, a case in which roaming is performed between an IMT-2000 network and a GSM network is envisaged, but the technology of the present invention may also be applied to authentication in a GSM network. In this case, the HLR of the GSM network includes, in the RAND field of the triplet, the information specifying the algorithm to be used during calculation in the subscriber identity module (an SIM (Subscriber Identity Module) in the case of GSM). By means of the processing described above, calculation can be performed using a specified algorithm even in a GSM, the specifications of which do not prescribe authentication through calculation using a specified algorithm, and hence the confidentiality of the calculation processing can be enhanced.

Modified Example

In the embodiment described above, the algorithm to be used during the calculation in the subscriber identity module is specified from among a plurality of algorithms, and calculation is performed using the specified algorithm. As a result, the confidentiality of the authentication process is enhanced. Here, the confidentiality of the authentication process is enhanced using a method of preparing a plurality of secret information for use during the calculation in advance, this information being known only to the authentication vector generation device (HLR) and the subscriber identity module, and specifying the information to be used during the calculation in a similar manner to the algorithm specification described above. For example, the secret information corresponds to a secret key shared by the authentication vector generation device and subscriber identity module for use during calculation in the authentication vector generation device and subscriber identity module, or information relating to an auxiliary key constituting a part of the secret key used during calculation in the authentication vector generation device and subscriber identity module (the information relating to this auxiliary key serves as a constitutional element of the secret key at the time of calculation in the authentication vector generation device or subscriber identity module). More specifically, the secret information is data having a predetermined information length, the information length of which is set differently for each algorithm used in the calculation.

Figure 4:
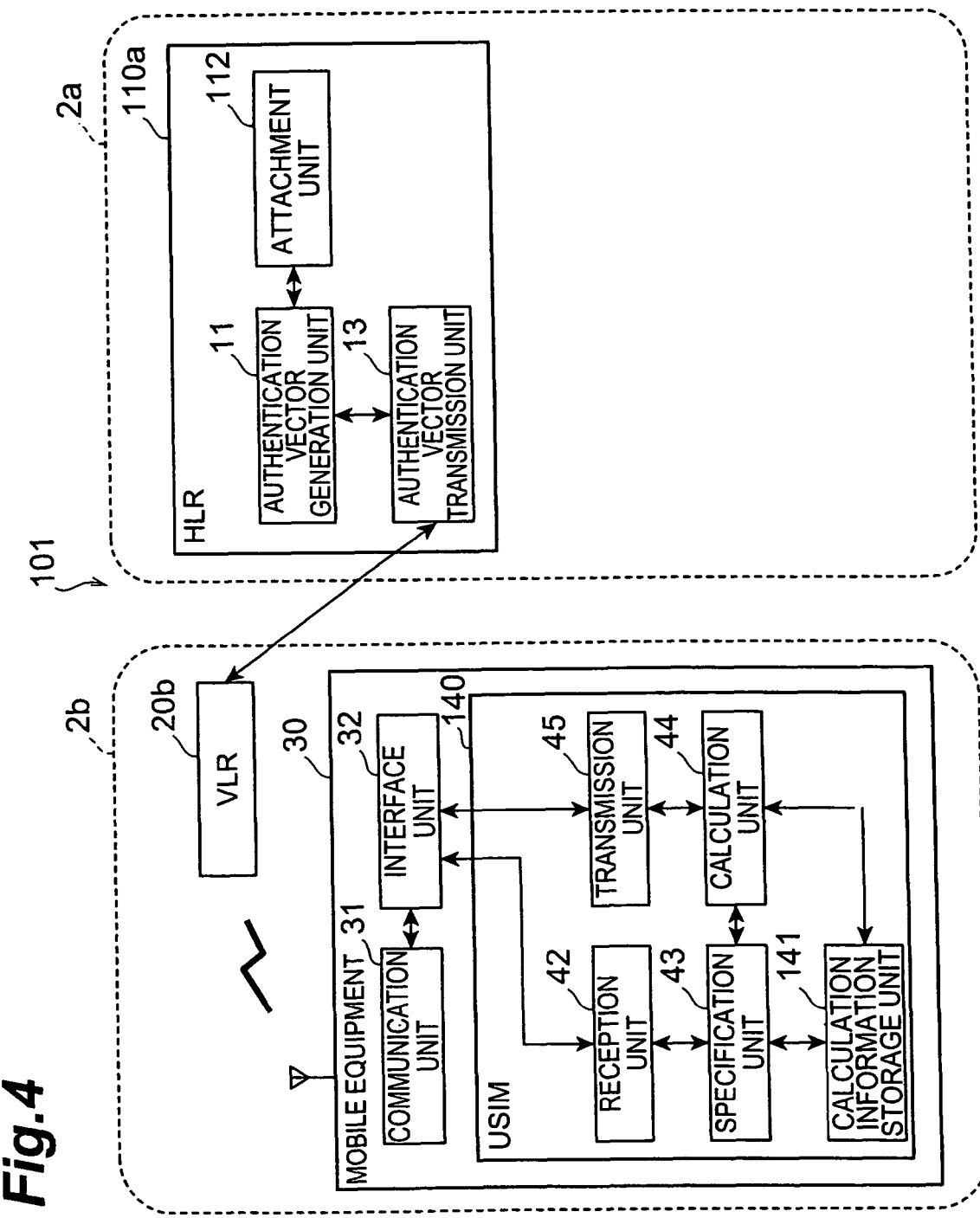
FIG. 4 is a view showing the constitution of a modified example of the mobile communication system according to this embodiment.

The constitution of a mobile communication system 101 in this case is shown in FIG. 4. The constitution of the mobile communication system 101 is basically the same as that of the embodiment described above with reference to FIG. 1, but differs therefrom in the constitutional elements of an HLR 110*a*, in which the algorithm information attachment unit 12 becomes an attachment unit 112 (attaching means), and in the constitutional elements of a USIM 140, in which the algorithm storage unit 41 becomes a calculation information storage unit 141 (calculation information storage means). The processing for authenticating the USIM 40, executed by the mobile communication system 101, is shown in the sequence diagram of FIG. 5. The content of this processing is basically the same as that described in the above embodiment with reference to the sequence diagram of FIG. 2, but differs in the processing of S03 and S07 in FIG. 2. This will be described in detail hereafter.

The attachment unit 112 of the HLR 110*a* reads the authentication vector generated by the authentication vector generation unit 11, and attaches to the RAND field of the authentication vector information specifying the calculation information, which consists of the secret information to be used during authentication calculation in the USIM 140. Here, the calculation information corresponds to the aforementioned secret information. Note that the information specifying the calculation information is preferably determined upon reception of an instruction from a control terminal (not shown) known as a console that is connected to the HLR 110*a*.

Figure 5:
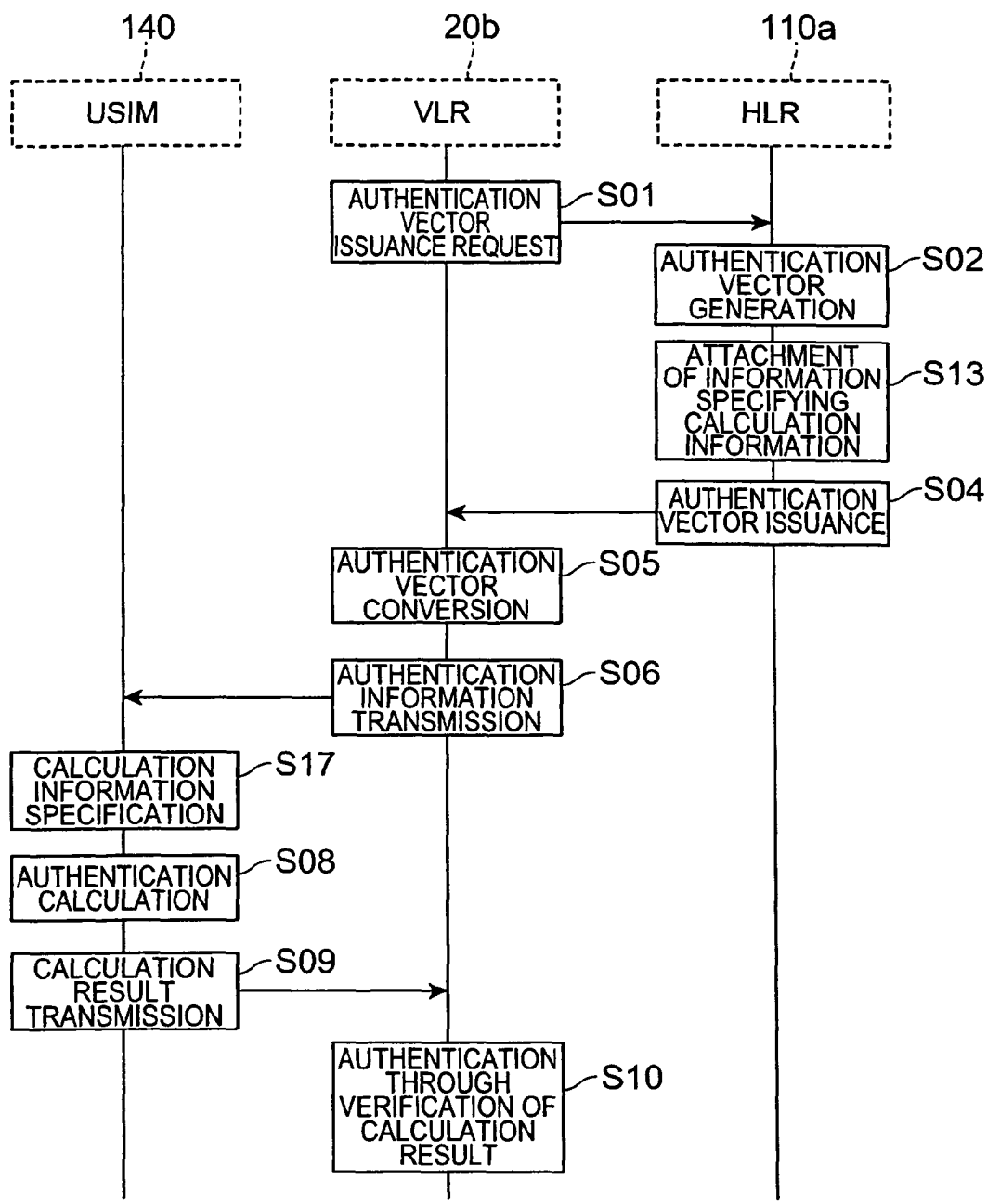
FIG. 5 is a sequence diagram showing the processing of the modified example, executed by the mobile communication system in this embodiment.

As shown in FIG. 5, when the authentication vector has been generated by the authentication vector generation unit 11 in the HLR 110a (S02), the attachment unit 112 attaches information specifying the calculation information to the generated authentication vector as described above (S13). Note that the processing of S13 corresponds to the processing of S03 in the embodiment described above. More specifically, as shown in FIG. 6A, a Key field for specifying the secret information is preferably provided in the RAND field, and a character string specifying the secret information is included in this Key field. Here, character strings are associated with the secret information in advance such that the character string "01h" corresponds to secret information Key-1, the character string "02h" corresponds to secret information Key-2, and so on, for example.

Note that, similarly to a case in which algorithm-specifying information is included, the random number information that is included originally in the RAND field must also be included here, and therefore the secret information-specifying field should have the minimum information length at which specification is possible. Further, the secret information-specifying information may be encoded using any method, or may remain as plain text. Also, authentication vector generation (S02) and attachment of the information specifying the calculation information (S13) are set as separate processes, but authentication vector generation and attachment of the information specifying the calculation information may be performed in a single process.

The calculation information storage unit 141 of the USIM 140 stores a plurality of secret information for use in the authentication calculation in advance. The stored secret information is typically known only to the HLR 110a and USIM 140. Algorithms for use in the authentication calculation, which are known only to the HLR 110a and USIM 140, are also stored in advance.

As shown in FIG. 5, when the data for use during the calculation are received by the reception unit 42 in the USIM 140, the specification unit 43 reads the data, and specifies the secret information from the plurality of secret information stored in the calculation information storage unit 141 by referring to the information specifying the secret information (calculation information) included in the RAND field (S17). Specifically, the secret information is preferably specified by reading the character string indicating the secret information in the Key field described above, and comparing this character string with correspondence information between the pre-stored character strings and secret information. Next, the calculation unit 44 performs the authentication calculation on the basis of the algorithm stored in the calculation information storage unit 141 using the specified secret information and the random number information included in the RAND field (S08). Note that the processing of S17 corresponds to the processing of S07 in the embodiment described above.

As described above, the USIM 140 can be authenticated with no decrease in the confidentiality of the calculation processing when the authentication calculation is performed using specified secret information. Accordingly, the USIM 140 can be used for a longer period of time in terms of security. Preventing decreases in the confidentiality of the calculation processing also works as a measure against cloning of the USIM 140. In this case also, few modifications are made from a conventional system, and hence implementation is simple. Further, similarly to the embodiment described previously, this case can also be applied to authentication in a GSM network.

In the embodiments described above, one of a plurality of either algorithms or secret information is specified, but calculation may be performed by specifying both an algorithm and secret information from pluralities thereof as the calculation information. In this case, information specifying the calculation information, which is constituted by both an algorithm and secret information, is attached by the attachment unit 112 of the HLR 110a. More specifically, as shown in FIG. 6B, an Algorithm field for specifying an algorithm and a Key field for specifying secret information are preferably provided in the RAND field, and character strings specifying the algorithm and the secret information, respectively, are included therein. Here, the length of the Algorithm field and Key field may be set to one octet length each, for example, such that when the two fields are joined, they have a total length of two bytes. Further, algorithm specification and secret information specification may be performed independently, or in combination.

The calculation information storage unit 141 of the USIM 140 stores a plurality of specification subject algorithms and secret information, and the specification unit 43 specifies the algorithm and secret information to be used in the calculation by referring to the information specifying the algorithm and secret information, included in the data of the RAND field.

Note that the plurality of secret information included in the calculation information storage unit 141 does not necessarily have to have fixed data lengths. In this case, application rules are preset between the HLR 110a and USIM 140 so that each algorithm is provided with an appropriate data length.

What is claimed is:

1. An authentication vector generation device comprising:
authentication vector generating means for generating in a home network of a subscriber identity module an authentication vector used to authenticate a subscriber identity module in a mobile communication network, said authentication vector having a RAND field, which will not be deleted or converted in said communication by roaming, for storing random numbers used in an authentication calculation performed in said subscriber identity module, wherein said subscriber identity module performs roaming in a Global System for Mobile Communications network;
attaching means for attaching, inside said RAND field of said generated authentication vector, calculation information that includes information, separate from said random numbers stored in said RAND field, specifying at least one of an algorithm to be selected from a plurality of algorithms stored in said subscriber identity module and secret information for use in said authentication calculation; and
a subscriber identity module including:
calculation information storage means for storing in advance a plurality of calculation information for use in said authentication calculation to authenticate said subscriber identity module;
reception means for receiving data for use in said authentication calculation, transmitted from said subscriber side terminal equipment, said data including said calculation information inside said RAND field of said authentication vector used to authenticate said subscriber identity module in said mobile communication network;
specifying means for specifying calculation information to be used in said authentication calculation from said plurality of calculation information stored in said calculation information storage means by referring to said calculation information inside said RAND field included in said received data;

calculating means for performing said authentication calculation on the basis of said specified calculation information using said received data; and transmitting means for transmitting information regarding a calculated result of said authentication calculation to said subscriber side terminal equipment.

2. A subscriber identity module mounted on subscriber side terminal equipment, comprising:

calculation information storage means for storing in advance in a home network of a subscriber identity module a plurality of calculation information including at least one of an algorithm selected from a plurality of algorithms stored in said subscriber identity module and secret information for use in an authentication calculation to authenticate said subscriber identity module, wherein said subscriber identity module performs roaming in a Global System for Mobile Communications network;

reception means for receiving data for use in said authentication calculation, transmitted from said subscriber side terminal equipment, said data including calculation information inside a RAND field, which will not be deleted or converted in said communication by roaming, storing random numbers for use in said authentication calculation, said RAND field being provided in an authentication vector used to authenticate said subscriber identity module in a mobile communication network, and said calculation information including information separate from said random numbers stored in said RAND field and specifying at least one of an algorithm to be selected from a plurality of algorithms stored in said subscriber identity module and secret information for use in said authentication calculation;

specifying means for specifying calculation information to be used in said authentication calculation from said plurality of calculation information stored in said calculation information storage means by referring to said calculation information inside said RAND field included in said received data;

calculating means for performing said authentication calculation on the basis of said specified calculation information using said received data; and transmitting means for transmitting information regarding a calculated result of said authentication calculation to said subscriber side terminal equipment.

3. A mobile communication system comprising:

an authentication vector generation device; and a subscriber identity module mounted on subscriber side terminal equipment, said authentication vector generation device including:

authentication vector generating means for generating in a home network of a subscriber identity module an authentication vector used to authenticate said subscriber identity module in a mobile communication network, said authentication vector having a RAND field, which will not be deleted or converted in said communication by roaming, for storing random numbers used in an authentication calculation performed in said subscriber identity module, wherein said subscriber identity module performs roaming in a Global System for Mobile Communications network; and attaching means for attaching, inside said RAND field of said generated authentication vector, calculation information that includes information, separate from said random numbers stored in said RAND field, specifying at least one of an algorithm to be selected from a plurality of algorithms stored in said subscriber identity module and secret information for use in said authentication calculation, and said subscriber identity module including:

calculation information storage means for storing in advance a plurality of calculation information for use in said authentication calculation to authenticate said subscriber identity module;

reception means for receiving data for use in said authentication calculation, transmitted from said subscriber side terminal equipment, said data including said calculation information inside said RAND field of said authentication vector used to authenticate said subscriber identity module in said mobile communication network;

specifying means for specifying calculation information to be used in said authentication calculation from said plurality of calculation information stored in said calculation information storage means by referring to said calculation information inside said RAND field included in said received data;

calculating means for performing said authentication calculation on the basis of said specified calculation information using said received data; and transmitting means for transmitting information regarding a calculated result of said authentication calculation to said subscriber side terminal equipment.

4. An authentication vector generation method in an authentication vector generation device, comprising:

generating in a home network of a subscriber identity module an authentication vector used to authenticate said subscriber identity module in a mobile communication network, said authentication vector having a RAND field, which will not be deleted or converted in said communication by roaming, for storing random numbers used in an authentication calculation performed in said subscriber identity module, wherein said subscriber identity module performs roaming in a Global System for Mobile Communications network;

attaching, inside said RAND field of said generated authentication vector, calculation information that includes information, separate from said random numbers stored in said RAND field, specifying at least one of an algorithm to be selected from a plurality of algorithms stored in said subscriber identity module and secret information for use in said authentication calculation;

receiving, in said subscriber identity module, data for use in said authentication calculation, transmitted from said subscriber side terminal equipment, said data including said calculation information inside said RAND field of said authentication vector used to authenticate said subscriber identity module in said mobile communication network;

specifying calculation information to be used in said authentication calculation from said stored plurality of calculation information by referring to said calculation information inside said RAND field included in said received data, performing said authentication calculation on the basis of said specified calculation information using said received data; and transmitting information regarding a calculated result of said authentication calculation to said subscriber side terminal equipment.

5. A calculation method in a subscriber identity module mounted on subscriber side terminal equipment, said calculation method comprising:

storing, in advance in a home network of a subscriber identity module, a plurality of calculation information including at least one of an algorithm selected from a plurality of algorithms stored in said subscriber identity module and secret information to be used in an authentication calculation to authenticate said subscriber identity module, wherein said subscriber identity module performs roaming in a Global System for Mobile Communications network;

receiving data for use in said authentication calculation, transmitted from said subscriber side terminal equipment, said data including calculation information inside a RAND field, which will not be deleted or converted in said communication by roaming, storing random numbers for use in said authentication calculation, said RAND field being provided in an authentication vector used to authenticate said subscriber identity module in a mobile communication network, and said calculation information including information separate from said random numbers stored in said RAND field and specifying at least one of an algorithm to be selected from a plurality of algorithms stored in said subscriber identity module and secret information to be used in an authentication calculation;

specifying calculation information to be used in said authentication calculation from said stored plurality of calculation information by referring to said calculation information inside said RAND field included in said received data;

performing said authentication calculation on the basis of said specified calculation information using said received data; and transmitting information regarding a calculated result of said authentication calculation to said subscriber side terminal equipment.

6. A subscriber authentication method in a mobile communication system comprising an authentication vector generation device, and a subscriber identity module mounted on subscriber side terminal equipment, said subscriber authentication method comprising:

storing, in said subscriber identity module in advance, a plurality of calculation information including at least one of an algorithm selected from a plurality of algorithms stored in said subscriber identity module and secret information to be used in an authentication calculation to authenticate said subscriber identity module;

generating in a home network of a subscriber identity module an authentication vector used to authenticate said subscriber identity module in a mobile communication network, said authentication vector having a RAND field, which will not be deleted or converted in said communication by roaming, for storing random numbers used in said authentication calculation performed in said subscriber identity module, wherein said subscriber identity module performs roaming in a Global System for Mobile Communications network;

attaching inside said RAND field of said generated authentication vector calculation information to be used in said authentication calculation, said calculation information including information separate from said random numbers stored in said RAND field and specifying calculation information to be used in said authentication calculation from said stored plurality of calculation information;

receiving, in said subscriber identity module, data for use in said authentication calculation, transmitted from said subscriber side terminal equipment, said data including said calculation information inside said RAND field of said authentication vector used to authenticate said subscriber identity module in said mobile communication network;

specifying calculation information to be used in said authentication calculation from said stored plurality of calculation information by referring to said calculation information inside said RAND field included in said received data;

performing said authentication calculation on the basis of said specified calculation information using said received data; and transmitting information regarding a calculated result of said authentication calculation to said subscriber side terminal equipment.

7. An authentication vector generating device comprising:

authentication vector generating means for generating in a home network of a subscriber identity module an authentication vector used to authenticate a subscriber identity module in a mobile communication network, said authentication vector having a RAND field, which will not be deleted or converted in said communication by roaming, for storing random numbers used in an authentication calculation performed in said subscriber identity module, wherein said subscriber identity module performs roaming in a Global System for Mobile Communications network;

algorithm information attaching means for attaching, inside said RAND field of said generated authentication vector, calculation information that includes information, separate from said random numbers stored in said RAND field, specifying at least one of an algorithm to be selected from a plurality of algorithms stored in said subscriber identity module for use in said authentication calculation; and a subscriber identity module including:

algorithm storage means for storing in advance said plurality of algorithms for use in said authentication calculation to authenticate said subscriber identity module;

reception means for receiving data for use in said authentication calculation, transmitted from said subscriber side terminal equipment, said data including said information separate from the random numbers specifying an algorithm inside said RAND field of said authentication vector used to authenticate said subscriber identity module in said mobile communication network;

specifying means for specifying an algorithm to be used in said authentication calculation from said plurality of algorithms stored in said algorithm storage means by referring to said information specifying said algorithm inside said RAND field, included in said received data;

calculating means for performing said authentication calculation on the basis of said specified algorithm using said received data; and transmitting means for transmitting information regarding a calculated result of said authentication calculation to said subscriber side terminal equipment.

8. A subscriber identity module mounted on subscriber side terminal equipment, comprising:

algorithm storage means for storing in said subscriber identity module in advance in a home network of a subscriber identity module a plurality of algorithms for use in an authentication calculation to authenticate said subscriber identity module, wherein said subscriber identity module performs roaming in a Global System for Mobile Communications network;

reception means for receiving data for use in said authentication calculation, transmitted from said subscriber side terminal equipment, said data including information specifying an algorithm inside a RAND field, which will not be deleted or converted in said communication by roaming, storing random numbers for use in said authentication calculation, said RAND field being provided in an authentication vector used to authenticate said subscriber identity module in a mobile communication network, said information specifying an algorithm being separate from said random numbers stored in said RAND field;

specifying means for specifying an algorithm to be used in said authentication calculation from said plurality of algorithms stored in said algorithm storage means by referring to said information separate from said random numbers specifying said algorithm inside said RAND field, included in said received data;

calculating means for performing said authentication calculation on the basis of said specified algorithm using said received data; and transmitting means for transmitting information regarding a calculated result of said authentication calculation to said subscriber side terminal equipment.

9. A mobile communication system comprising:
an authentication vector generation device; and
a subscriber identity module mounted on subscriber side terminal equipment,
said authentication vector generation device including:
authentication vector generating means for generating in a home network of a subscriber identity module an authentication vector used to authenticate said subscriber identity module in a mobile communication network, said authentication vector having a RAND field, which will not be deleted or converted in said communication by roaming, for storing random numbers used in an authentication calculation performed in said subscriber identity module, wherein said subscriber identity module performs roaming in a Global System for Mobile Communications network; and
algorithm information attaching means for attaching, inside said RAND field of said generated authentication vector, information separate from said random number stored in said RAND field and specifying an algorithm to be selected from a plurality of algorithms stored in said subscriber identity module for use in said authentication calculation, and
said subscriber identity module including:
algorithm storage means for storing in advance said plurality of algorithms for use in said authentication calculation to authenticate said subscriber identity module;
reception means for receiving data for use in said authentication calculation, transmitted from said subscriber side terminal equipment, said data including said information separate from the random numbers specifying an algorithm inside said RAND field of said authentication vector used to authenticate said subscriber identity module in said mobile communication network;
specifying means for specifying an algorithm to be used in said authentication calculation from said plurality of algorithms stored in said algorithm storage means by referring to said information specifying said algorithm inside said RAND field, included in said received data;

calculating means for performing said authentication calculation on the basis of said specified algorithm using said received data; and transmitting means for transmitting information regarding a calculated result of said authentication calculation to said subscriber side terminal equipment.

10. An authentication vector generation method in an authentication vector generation device, comprising:
generating in a home network of a subscriber identity module an authentication vector used to authenticate a subscriber identity module in a mobile communication network, said authentication vector having a RAND field, which will not be deleted or converted in said communication by roaming, for storing random numbers used in an authentication calculation performed in said subscriber identity module, wherein said subscriber identity module performs roaming in a Global System for Mobile Communications network;
attaching, inside said RAND field of said generated authentication vector, information separate from said random numbers stored in said RAND field and specifying an algorithm to be selected from a plurality of algorithms stored in said subscriber identity module for use in said authentication calculation;
receiving, at said subscriber identity module, data for use in said authentication calculation, transmitted from said subscriber side terminal equipment, said data including said information separate from said random numbers specifying said algorithm inside said RAND field of said authentication vector used to authenticate said subscriber identity module in said mobile communication network;
specifying said algorithm to be used in said authentication calculation from said stored plurality of algorithms by referring to said information specifying said algorithm inside said RAND field included in said received data;
performing said authentication calculation on the basis of said specified algorithm using said received data; and
transmitting information regarding a calculated result of said authentication calculation to said subscriber side terminal equipment.

11. A calculation method in a subscriber identity module mounted on subscriber side terminal equipment, said calculation method comprising:
storing in said subscriber identity module in advance in a home network of a subscriber identity module a plurality of algorithms to be used in an authentication calculation to authenticate said subscriber identity module, wherein said subscriber identity module performs roaming in a Global System for Mobile Communications network;
receiving data for use in said authentication calculation, transmitted from said subscriber side terminal equipment, said data including information specifying an algorithm inside a RAND field, which will not be deleted or converted in said communication by roaming, storing random numbers for use in said authentication calculation, said RAND field being provided in an authentication vector used to authenticate said subscriber identity module in a mobile communication network, and said information specifying an algorithm being separate from said random numbers stored in said RAND field;
specifying an algorithm to be used in said authentication calculation from said plurality of algorithms stored in said subscriber identity module by referring to said information separate from said random numbers specifying said algorithm inside said RAND field included in said received data;

performing said authentication calculation on the basis of said specified algorithm using said received data; and transmitting information regarding a calculated result of said authentication calculation to said subscriber side terminal equipment.

12. A subscriber authentication method in a mobile communication system comprising an authentication vector generation device, and a subscriber identity module mounted on subscriber side terminal equipment, said subscriber authentication method comprising:

storing in said subscriber identity module in advance a plurality of algorithms to be used in an authentication calculation to authenticate said subscriber identity module, wherein said subscriber identity module performs roaming in a Global System for Mobile Communications network;

generating in a home network of a subscriber identity module, in said authentication vector generation device, an authentication vector used to authenticate said subscriber identity module in a mobile communication network, said authentication vector having a RAND field, which will not be deleted or converted in said communication by roaming, for storing random numbers used in said authentication calculation performed in said subscriber identity module;

attaching, inside said RAND field of said generated authentication vector, information separate from said random number stored in said RAND field and specifying an algorithm to be selected from said plurality of algorithms stored in said subscriber identity module to be used in said calculation;

receiving, at said subscriber identity module, data for use in said authentication calculation, transmitted from said subscriber side terminal equipment, said data including said information separate from said random numbers specifying said algorithm inside said RAND field of said authentication vector used to authenticate said subscriber identity module in said mobile communication network;

specifying said algorithm to be used in said authentication calculation from said stored plurality of algorithms by referring to said information specifying said algorithm inside said RAND field included in said received data;

performing said authentication calculation on the basis of said specified algorithm using said received data; and transmitting information regarding a calculated result of said authentication calculation to said subscriber side terminal equipment.

13. The authentication vector generation device according to claim 1, wherein said information specifying said at least one algorithm is arranged in a character string separate from said random numbers.

14. The subscriber identity module according to claim 2, wherein said information specifying said at least one algorithm is arranged in a character string separate from said random numbers.

15. The mobile communication system according to claim 3, wherein said information specifying said at least one algorithm is arranged in a character string separate from said random numbers.

16. The authentication vector generation method according to claim 4, wherein said information specifying said at least one algorithm is arranged in a character string separate from said random numbers.

17. The calculation method in a subscriber identity module according to claim 5, wherein said information specifying said at least one algorithm is arranged in a character string separate from said random numbers.

18. The subscriber authentication method according to claim 6, wherein said information specifying said at least one algorithm is arranged in a character string separate from said random numbers.

19. The authentication vector generation device according to claim 7, wherein said information specifying said at least one algorithm is arranged in a character string separate from said random numbers.

20. The subscriber identity module according to claim 8, wherein said information specifying said at least one algorithm is arranged in a character string separate from said random numbers.

21. The mobile communication system according to claim 9, wherein said information specifying said at least one algorithm is arranged in a character string separate from said random numbers.

22. The authentication vector generation method according to claim 10, wherein said information specifying said at least one algorithm is arranged in a character string separate from said random numbers.

23. The calculation method according to claim 11, wherein said information specifying said at least one algorithm is arranged in a character string separate from said random numbers.

24. The subscriber authentication method according to claim 12, wherein said information specifying said at least one algorithm is arranged in a character string separate from said random numbers.

* * * * *